United States Patent
Colloton et al.

(10) Patent No.: US 9,563,180 B2
(45) Date of Patent: Feb. 7, 2017

(54) CONFIGURATION-ENABLED MOTOR DRIVE SAFETY

(71) Applicant: Rockwell Automation Technologies, Inc., Mayfield Heights, OH (US)

(72) Inventors: Kevin E. Colloton, Waukesha, WI (US); Jeremy S. Vechinski, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 393 days.

(21) Appl. No.: 14/194,616

(22) Filed: Feb. 28, 2014

(65) Prior Publication Data

US 2015/0248115 A1    Sep. 3, 2015

(51) Int. Cl.
G05B 9/02    (2006.01)
G05B 19/042  (2006.01)
G05B 15/02   (2006.01)

(52) U.S. Cl.
CPC ............... *G05B 9/02* (2013.01); *G05B 15/02* (2013.01); *G05B 19/0428* (2013.01)

(58) Field of Classification Search
CPC .................................. G05B 9/02; G05B 15/02
USPC ......................................................... 318/563
See application file for complete search history.

(56) References Cited

U.S. PATENT DOCUMENTS

| | | | |
|---|---|---|---|
| 4,196,462 A * | 4/1980 | Pohl | H02P 1/44 318/430 |
| 7,208,909 B2 * | 4/2007 | Simon | H02H 7/0816 318/430 |
| 2006/0224811 A1 * | 10/2006 | Sichner | G05B 19/0428 710/306 |
| 2007/0035897 A1 | 2/2007 | Simon | |
| 2007/0273323 A1 * | 11/2007 | Acquaviva | H02P 25/024 318/720 |

(Continued)

FOREIGN PATENT DOCUMENTS

EP    1770460 A2    9/2006

OTHER PUBLICATIONS

Extended European Search Report mailed Jul. 7, 2015 for European Application No. 15155160.3, 5 pages.

(Continued)

*Primary Examiner* — Kawing Chan
(74) *Attorney, Agent, or Firm* — Amin, Turocy & Waston, LLP

(57) ABSTRACT

A safety-rated industrial device, such as a motor drive, is provided with a safety subsystem that is initially bypassed as a factory default mode. While the safety subsystem is disabled, the device operates as a standard non-safety device, allowing users to perform operations with the device (e.g., turning a motor in the case of motor drives) without requiring safety input devices or a safety controller to be connected to the device. The device continues to operate as a standard non-safety device until a proper safety configuration is applied to the device, whereby the device's safety subsystem is retentatively enabled and the device begins operating as a safety-rated device. While the safety subsystem is enabled, certain device operations that were permitted during standard mode independently of an attached safety controller or safety input devices are made contingent on the monitored status of an associated safety system.

20 Claims, 10 Drawing Sheets

(56) References Cited

U.S. PATENT DOCUMENTS

2011/0182703 A1* 7/2011 Alan .................. E04H 6/183
                                                            414/231
2012/0072055 A1   3/2012 Barlsen et al.

OTHER PUBLICATIONS

"Kinetix Safe Torque-off Feature" Allen-Bradley Safety Reference Manual, Rockwell Automation, Jun. 1, 2013, retrieved from the Internet: [http://literature.rockwellautomation.com/idc/groups/literature/documents/rm/gmc-rm002_-en-p.pdf], retrieved on Jun. 30, 2015, 52 pages.

* cited by examiner

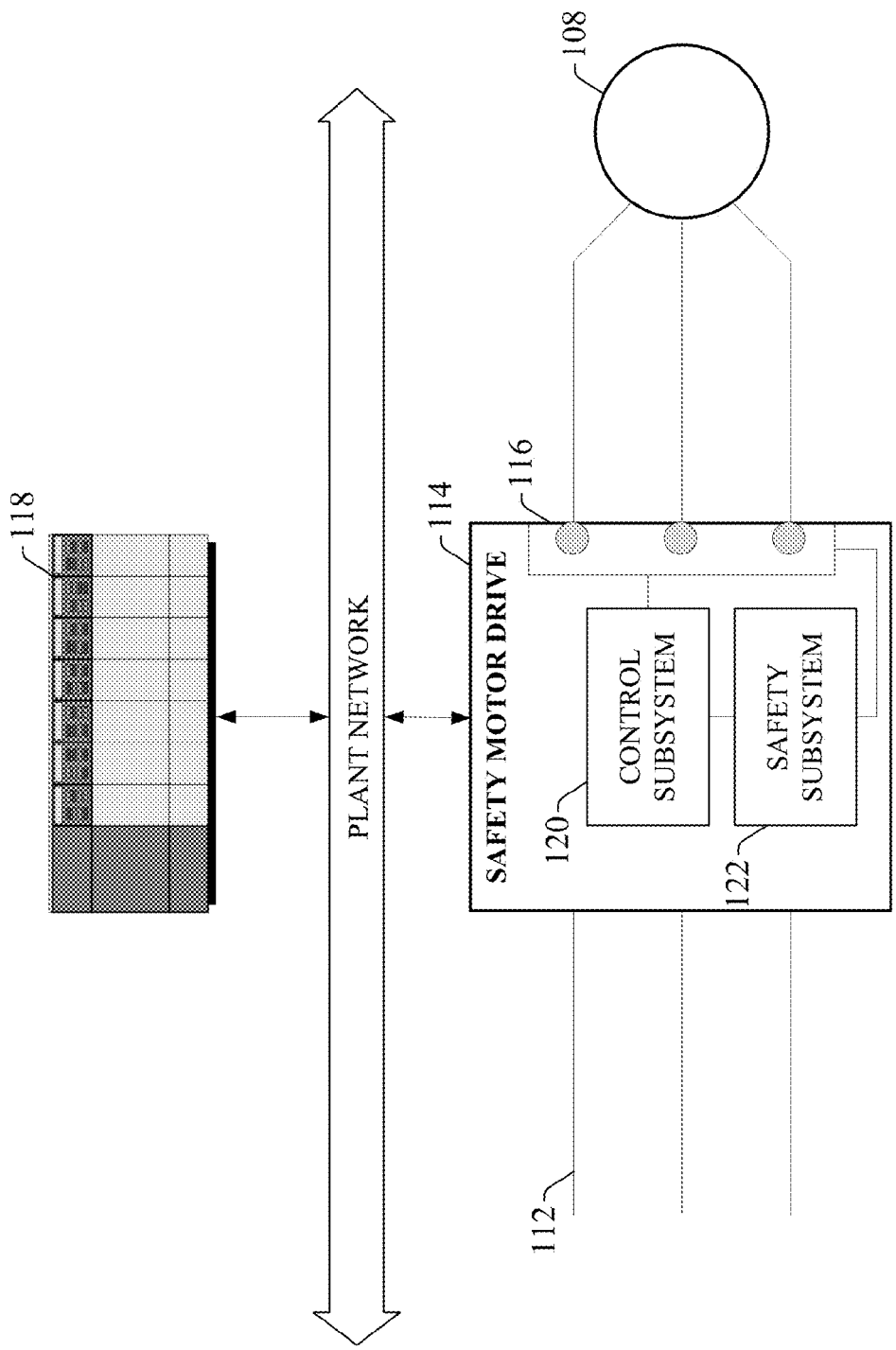

CONFIGURATION-ENABLED MOTOR DRIVE SAFETY

TECHNICAL FIELD

The subject application relates generally to industrial automation, and, more particularly, to motor drives or other industrial devices having safety features that can be initially bypassed and subsequently enabled in response to receipt of a safety configuration.

BACKGROUND

Many industrial automation systems include safety-rated devices with integrated safety subsystems that prevent or disable certain potentially unsafe device operations until a set of defined safe conditions are satisfied. For example, safety-rated motor drives (e.g., variable frequency drives, servo drives, etc.) are often configured to prevent the drive from turning a motor until the drive's safety features are properly configured and all defined safety conditions are satisfied. In the case of stand-alone drives (drives that operate independently of an external controller), this means that the user cannot instruct the drive to turn its associated motor—even in a pre-installation testing scenario—until the drive's safety configuration is defined and the safety input devices connected to the drive's safety inputs are confirmed to be in their respective safe states. In the case of networked safety drives (drives that operate under supervision of a safety controller that communicates with the drive over a network), the drive is prevented from turning a motor until the drive is connected to a properly configured safety controller and fully integrated into the larger safety system. Other safety-related devices, including but not limited to stand-alone and networked servos, enforce similar restrictions on certain operations until the device has been configured with a proper safety configuration.

During start-up or testing of an industrial system that includes such safety-rated devices, system designers often have need to execute a restricted operation—e.g., test run a motor to be controlled via a safety-rated motor drive—before the safety configuration is in place. This especially problematic in the case of networked safety devices, since the device must be networked to a configured safety controller before these restricted operations will be permitted. This creates an additional hardship during testing and installation, since the system designers may wish to perform these operations well before the rest of the safety system is in place.

The availability of both standard and safety-rated drives (and other devices) can also render inventory management more difficult. For example, a plant facility that utilizes both standard and safety-rated drives in their industrial systems must maintain both types of drives in inventory for replacement purposes.

The above-described deficiencies of today's industrial safety devices are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to networked safety-rated devices that initially bypass safety functionality until a valid user safety configuration is provided. For example, a safety-rated motor drive may include a safety subsystem that is initially disabled while the device is in its initial default (e.g., "out-of-box," or OOB) state. Although the motor drive includes a running safety subsystem, the motor drive behaves as a standard (non-safety) motor drive and thus allows a user to perform operations that would otherwise be restricted if the safety subsystem were not bypassed. Thus, the drive allows the user to turn the motor without being in communication with a properly configured safety controller. The drive continues to operate in this standard mode until a proper safety configuration is applied to the drive (e.g., the drive is networked to a configured safety controller and the controller assumes ownership of the drive's safety subsystem), which enables the drive's safety subsystem and places the drive in safety mode. This transition to safety mode is retentive, such that the drive is maintained in safety mode even if power to the drive is cycled. If a safety configuration is not applied, the drive can be operated as a standard (non-safety) drive indefinitely and used in an industrial system that does not require functional safety.

Motor drives, servos, or other safety-rated devices having such configuration-enabled safety features offer a number of benefits. For one, since the drives are provided to the end user preconfigured to operate in standard (non-safety) mode, the user is free to command the drive to turn its associated motor or to perform other operations that would otherwise be restricted if the drive's safety subsystem was enabled. This affords the user a greater degree of flexibility during testing and system installation and startup, since the drive need not be connected to a safety controller (or otherwise configured with a proper safety configuration) in order to actuate the motor. This drive behavior is justified by the observation that, until the drive is properly configured to operate under the supervision of a safety controller, there is no expectation of safety functionality, and it is assumed that the drive is being operated under controlled conditions defined by the user of the drive.

Moreover, since the drive initially operates in standard mode, and enables its safety subsystem in response to application of a proper safety configuration (e.g., deployment of the device within a properly configured safety system under the supervision of a safety controller), the safety features are initially bypassed without the need to install a hardware jumper across dedicated safety bypass terminals (or other such means). As such, safety bypass terminals can be omitted from the drive, mitigating the possibility of improper or unsafe hardware bypassing of the device's safety features while in production use.

Also, the disclosed configuration allows an industrial enterprise to standardize on one type of motor drive (or other control device) which can be flexibly configured for either standard or safety applications. In this way, the plant facility is only required to stock one type of device in inventory for replacement purposes, rather than maintaining both standard and safety-rated versions of the device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 1B illustrates an example safety-rated motor drive.

DETAILED DESCRIPTION

Figure 1A:
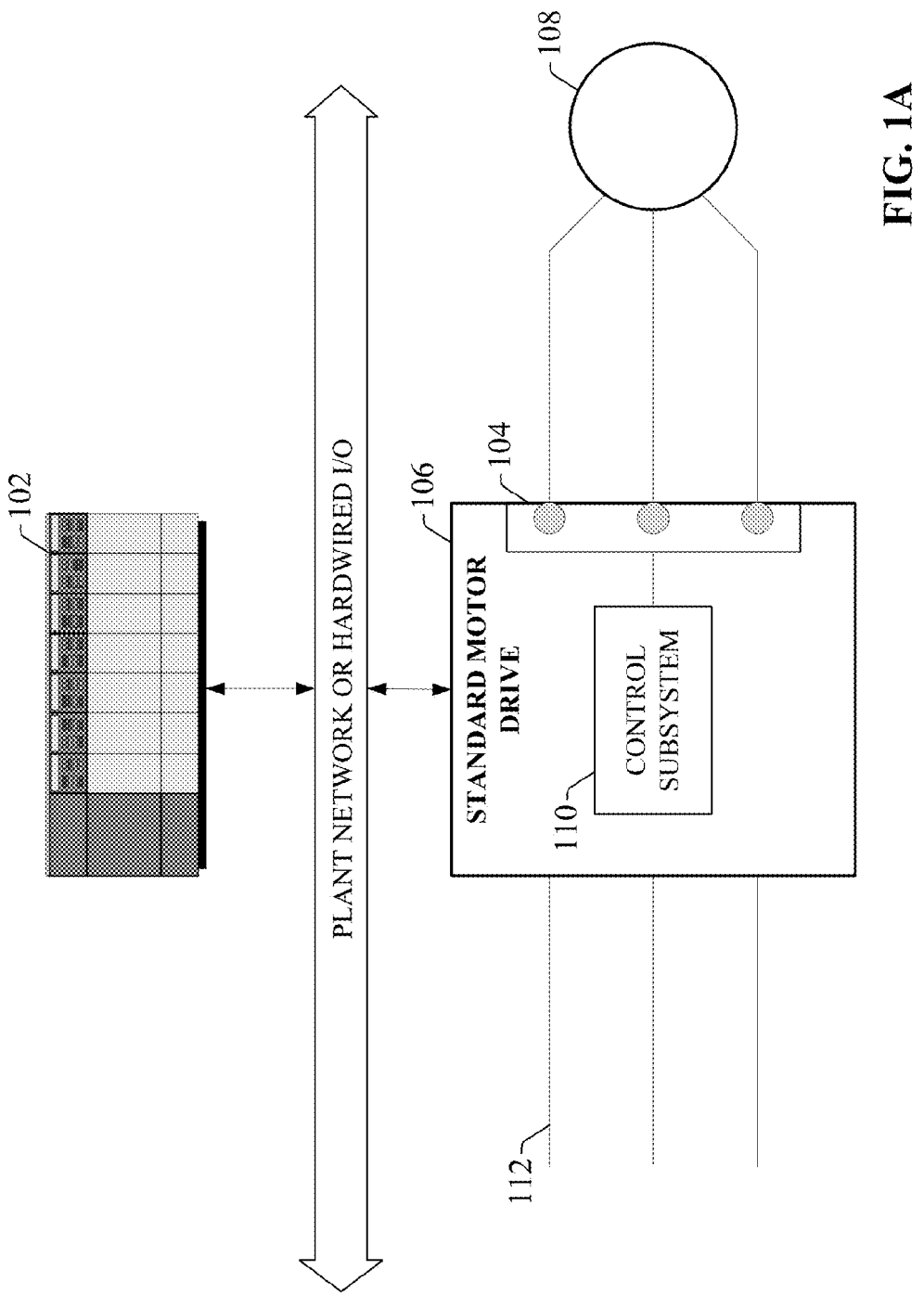
FIG. 1A illustrates an example standard (non-safety-rated) motor drive.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

To illustrate general distinctions between standard and safety-rated devices, FIGS. 1A and 1B depict standard and safety-rated motor drives, respectively. Although some examples herein are described in connection with industrial motor drives (e.g., variable frequency drives or the like), it is to be appreciated that the configuration-enabled safety aspects described herein are applicable to other types of industrial devices for which both standard and safety-rated versions are typically available (e.g., servos).

FIG. 1A illustrates an example standard (non-safety-rated) motor drive. Standard motor drive 106 is used to control the speed and/or torque of alternating current (AC) motor 108 by controlling the frequency and voltage of three-phase power delivered to the motor via power lines 112 (or by controlling the frequency of pulse outputs in the case of certain types of servo drives). The standard motor drive 106 may be configured as a stand-alone drive that controls motor 108 according to a control routine stored locally on the drive. Alternatively, standard motor drive 106 may be configured as a networked drive that operates under supervision of a control program executed by an industrial controller 102 (e.g., a programmable logic controller or the like), which communicates with motor drive 106 over a plant network or via discrete hardwired I/O. Industrial controller 102 typically runs a control program comprising code used to process input signals read into the controller 102 and to control output signals from the controller 102, where the code can comprise, for example, ladder logic, sequential function charts, function block diagrams, or structured text. In the example illustrated in FIG. 1A, industrial controller 102 generates instruction outputs (either hardwired outputs or networked commands send to the drive via a plant network) in accordance with the control program.

Standard motor drive 106 includes a control subsystem 110, which comprises the circuitry, processors, and/or software responsible for controlling the drive's three-phase voltage outputs (or pulse outputs) to motor 108 based on either the local control routine (in the case of stand-alone drives) or in response to commands issued by industrial controller 102.

FIG. 1B illustrates an example safety-rated motor drive 114. Similar to the standard motor drive 106 illustrated in FIG. 1A, safety-rated motor drive 114 controls the three-phase voltage delivered to motor 108 via the drive's outputs 116, thereby controlling the speed and/or torque of the motor. In addition to control subsystem 120, safety-rated motor drives include a safety subsystem 122, which electronically disables or enables the output stage of the drive based on the status of one or more monitored safety conditions, preventing the drive's outputs 116 from sending control signals to the motor until a defined set of safety conditions are satisfied. This functionality is known as Safe Torque Off (STO). In the case of stand-alone drive configurations, the safety-rated motor drive 114 may include additional hardwired safety inputs for monitoring the statuses of external safety input devices (e.g., light curtains, safety mats, emergency stop buttons, safety pull cords, etc.). In this scenario, safety subsystem 122 only enables the drive's outputs 116 if the appropriate signals are detected on these dedicated safety inputs, thus preventing motor 108 from turning until safe conditions have been confirmed.

In the case of networked safety drives, the drive 114 operates under the supervision and control of a safety controller 118, which communicates with the drive 114 over a plant network. Safety controller 118 generally comprises a safety PLC, safety relay, or similar device configured to monitor an industrial safety system and control the ability of an industrial system or machine (e.g., drive 114) to start or run based on the monitored statuses of one or more safety input devices. For such networked configurations, safety-rated motor drive 114 will maintain STO (preventing the drive's outputs 116 from applying torque to motor 108) until the drive's safety subsystem is properly configured. In this regard, safety-rated motor drive 114 may be configured such that the drive will not operate until the safety controller 118 is properly configured and has taken ownership of the drive.

Although these safety precautions are vital to safe operation during normal operation after the drive has been deployed within an industrial safety system, such safety precautions can be a hindrance during testing and installation of the drive. For example, during installation and startup of a new industrial system, a system designer may need to operate the drive to cause the motor to turn well before the control system (including safety controller 118) is in place or ready, in order to independently test the motor control portion of the larger industrial system (e.g., to tune the motor or to configure certain drive parameters). However, for safety-rated drives, the user is often prevented from operating the drive until the safety controller 118 is properly configured and communicating with the drive 114, forcing the designer to postpone motor control testing or tuning until the safety controller has been installed and configured to recognize the drive 114.

To mitigate this issue, networked safety drives (or other types of safety-rated devices) according to one or more embodiments of the present disclosure are configured to operate in accordance with an initial default mode in which the drive behaves as a standard motor drive (similar to the standard motor drive 106 described above in connection with FIG. 1A). That is, although the drive includes a functional safety subsystem, the drive is delivered to an end user preconfigured to operate in an initial (e.g., "out of the box") standard mode in which the safety subsystem is operational but bypassed. By this configuration, even if the drive is intended to be operated as a safety drive (rather than as a standard drive) during normal operation, the drive can initially be operated as a standard (non-safety) drive during testing, installation, and startup, until the drive is ready to be fully deployed within an operating industrial system. Thus, the user is permitted to operate the drive to perform actions (such as turning an associated motor) that would normally be restricted by the STO function when the safety subsystem is enabled. This standard mode is maintained without the need for a hardware safety bypass (e.g., a jumper placed across dedicated safety bypass terminals on the drive), and thus such hardware safety bypass mechanisms can be omitted from the drive.

The drive's safety subsystem remains bypassed until a valid safety configuration is applied to the drive. For example, the drive may automatically transition from its initial standard mode to safety mode (enabling the drive's safety subsystem) in response to a determination that an external safety controller (e.g., safety controller 118) has taken ownership of the drive's safety subsystem. This transition to safety mode is retentive, such that the drive cannot be placed back in standard mode (or the drive's safety configuration cleared) unless a qualified technician performs a low-level, multi-step operation to place the drive back in its initial out-of-box (OOB) state.

Figure 2:
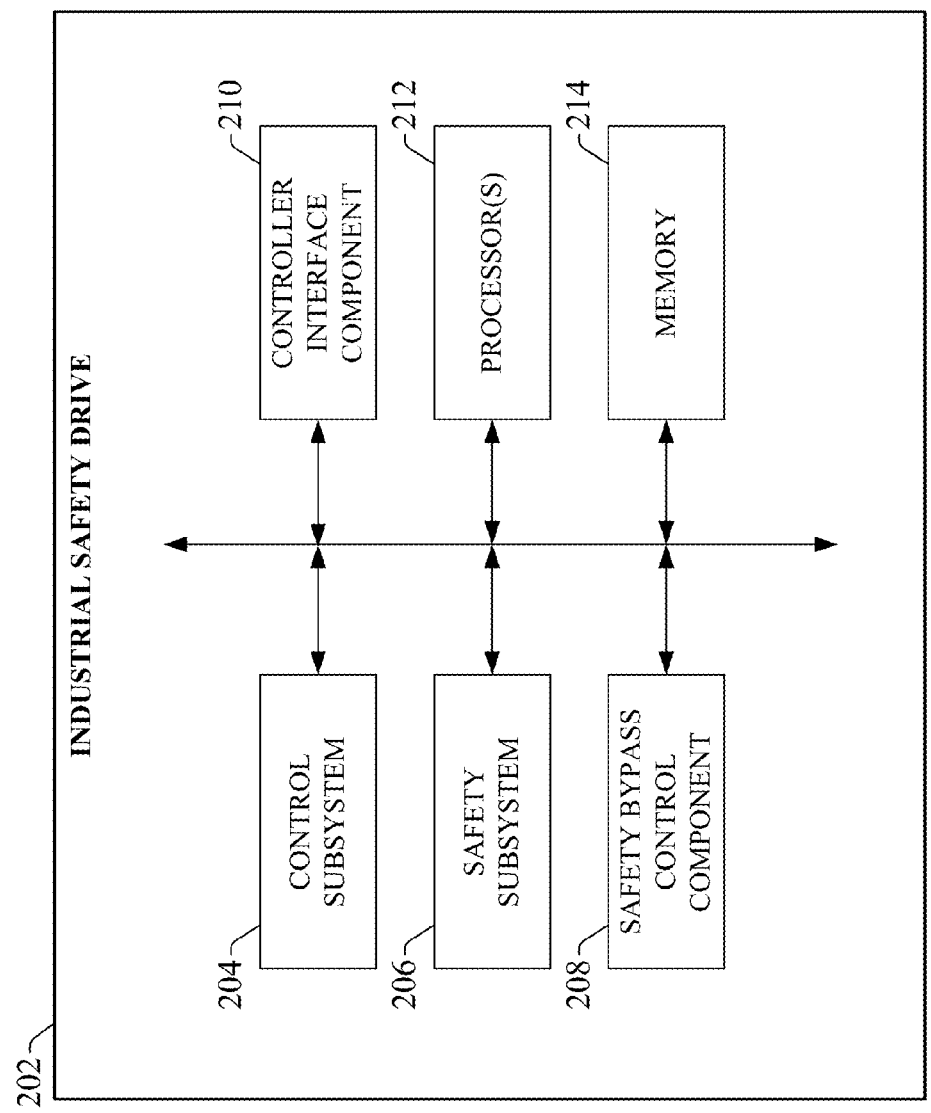
FIG. 2 is a block diagram of an example industrial motor drive with configuration-enabled safety.

FIG. 2 is a block diagram of an example industrial safety drive 202 according to one or more embodiments of this disclosure. Although FIG. 2 is depicted as a motor drive, it is to be appreciated that concepts described herein are applicable to substantially any type of safety-rated industrial device. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial safety drive 202 can include a control subsystem 204, a safety subsystem 206, a safety bypass control component 208, a controller interface component 210, one or more processors 212, and memory 214. In various embodiments, one or more of the control subsystem 204, safety subsystem 206, safety bypass control component 208, controller interface component 210, the one or more processors 212, and memory 214 can be electrically and/or communicatively coupled to one another to perform one or more of the functions of the industrial safety drive 202. In some embodiments, components 204, 206, 208, and 210 can comprise software instructions stored on memory 214 and executed by processor(s) 212. Industrial safety drive 202 may also interact with other hardware and/or software components not depicted in FIG. 2. For example, processor(s) 212 may interact with one or more external user interface devices, such as a keyboard, a mouse, a display monitor, a touchscreen, or other such interface devices.

Control subsystem 204 can be configured to control the drive's outputs (e.g., three-phase voltage outputs or pulse output frequency) to a motor based on either a local control configuration (in the case of stand-alone drives) or in response to commands issued by a networked safety controller. For safety-rated devices other than motor drives, control subsystem 204 may perform different functions depending on the type of device. Safety subsystem 206 can be configured to prevent or disable certain potentially unsafe operations of the industrial safety drive 202 until a set of defined safe conditions are satisfied. For example, safety subsystem 206 may be configured to initiate Safe Torque Off (STO) in the drive to disable the drive's outputs to the motor (preventing application of torque on the motor) if it is determined that a defined set of safety conditions are not satisfied. In some embodiments, this determination can be made by an external safety controller that monitors a set of safety input devices (e.g., emergency stop buttons, light curtains, safety mats, etc.) and instructs the safety subsystem 206 of safety drive 202 to initiate STO if one or more of the monitored safety inputs are determined to indicate a potentially unsafe state.

Safety bypass control component 208 can be configured to control enablement of safety subsystem 206. While in an initial out-of-box (OOB) state, the drive's safety bypass control component 208 can be configured to disable safety subsystem 206, thereby allowing safety drive 202 to operate in a standard (non-safety) mode in which the drive's outputs to the motor are controlled exclusively by control subsystem 204, and are not contingent on a state of safety subsystem 206. Upon detection of a proper safety configuration, safety bypass control component 208 can enable safety subsystem 206, causing the safety drive 202 to operate in safety mode.

Controller interface component 210 can be configured to exchange data with a networked industrial safety controller. Controller interface component 210 can be configured to communicate with the safety controller over substantially any type of network, including but not limited to control and information protocol (CIP) networks (e.g., DeviceNet, ControlNet, Ethernet/IP, etc.), Ethernet, DH/DH+, Remote I/O, Fieldbus, Modbus, Profibus, CAN, wireless networks, serial protocols, or other such networks.

The one or more processors 212 can perform one or more of the functions described herein with reference to the systems and/or methods disclosed. Memory 214 can be a computer-readable storage medium storing computer-executable instructions and/or information for performing the functions described herein with reference to the systems and/or methods disclosed.

Figure 3:
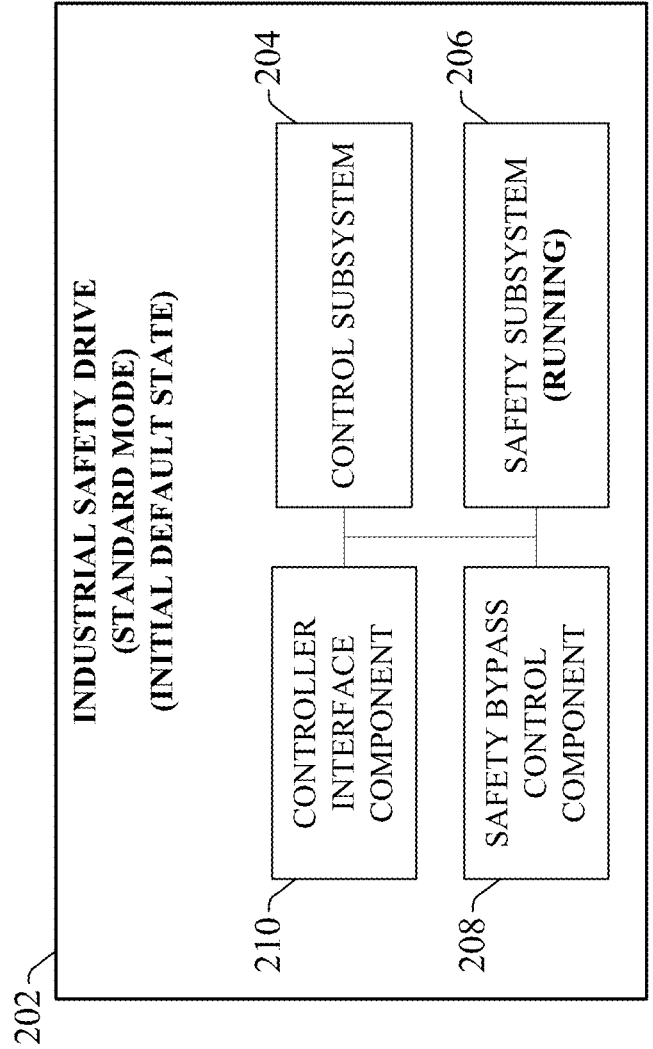
FIG. 3 illustrates and industrial safety drive operating in standard (non-safety) mode.

FIG. 3 illustrates industrial safety drive 202 operating in standard (non-safety) mode. As noted above, drive 202 is provided to end users preconfigured to operate in standard mode as an initial default (OOB) state. This initial default state is maintained by safety bypass control component 208 without the need for a local hardware bypass on the exterior of the drive (e.g., dedicated bypass terminals or a bypass switch on the drive housing).

When industrial safety drive 202 is powered up while in its initial default state (e.g., the drive's immediate out-of-box state, or any time prior to detection of a proper safety configuration), the drive 202 executes an internal diagnostic routine to verify proper operation of all internal components. Although the drive is initially configured to operate as a standard drive (allowing full operation of the drive independent of a connection to a safety controller or other such safety configuration), the drive's safety subsystem 206 is nevertheless powered up at system startup and allowed to run, albeit in a disabled state that prevents the safety subsystem 206 from restricting operations performed by the drive's control subsystem 204. In one or more embodiments, if the safety subsystem 206 does not power up correctly, the drive will initiate its STO function and disable the drive's control outputs, preventing any motors connected to the drive's outputs from running.

The safety bypass control component 208 then makes a determination regarding whether a safety configuration has been applied to the drive. For example, the safety bypass control component 208 can determine whether a properly configured safety controller has been networked to the drive 202 via controller interface component 210, or whether the drive 202 has been previously configured for safety operation by a networked safety controller. If the safety bypass control component 208 detects no safety configuration or networked safety controller, the safety subsystem 206 remains running but bypassed, allowing the drive 202 to continue operating as a standard drive. Until the drive is properly configured for safety via integration into a networked safety system, the drive will continue to behave as a standard drive (e.g., similar to standard motor drive 106 of FIG. 1A), and any motors connected to the drive outputs can be actuated without being dependent on a state of an external safety circuit or safety controller. If the drive 202 is intended for use in an industrial system that does not require a safety system, the drive 202 may continue to operate in standard mode indefinitely, even during normal runtime of the industrial system after system startup, provided the drive's safety features are not subsequently configured. Until the drive 202 is properly configured by a safety controller there is no expectation of safety functionality, and the drive 202 will continue to behave as a standard motor drive.

Figure 4:
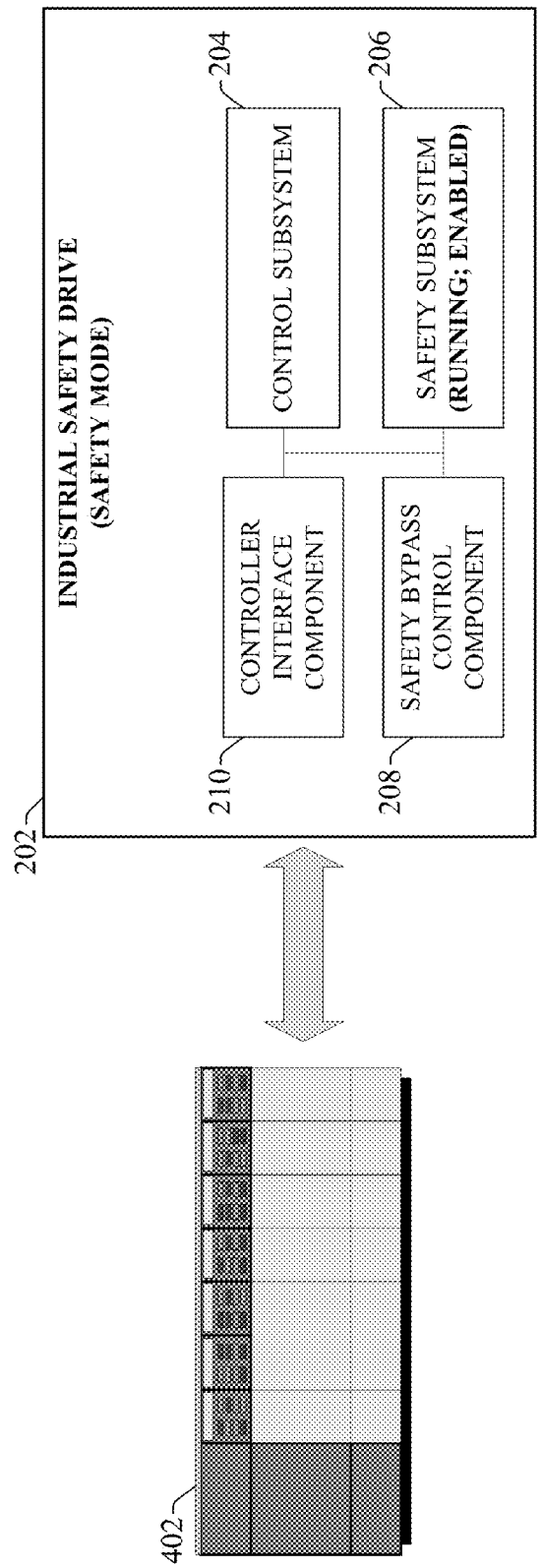
FIG. 4 illustrates industrial motor drive operating with safety integrity.

FIG. 4 illustrates industrial safety drive 202 operating in safety mode. Industrial safety drive 202 has previously been operating as a standard drive, as depicted and described above in connection with FIG. 3. In this example, an industrial safety controller 402 has been networked to the drive 202 (e.g. over a plant network via controller interface component 210) and configured to take ownership of the drive. For example, safety controller 402 may be programmed to monitor the states of various safety input devices (not shown) comprising a safety system (e.g., emergency stop buttons, light curtains, etc.), and control the ability of safety drive 202 to apply torque to its associated motor based on the monitored safety input statuses. In some embodiments, safety controller 402 may also be configured to monitor operational parameters of the drive itself— including but not limited to the drive's speed, torque, or motion profile—and initiate the drive's STO in response to determining that one or more of these monitored parameters meets a condition indicative of unsafe operation. For example, the safety controller may be configured to initiate the drive's STO in response to a determination that the drive is applying a torque to the motor that exceeds a defined upper torque limit, or that the drive is accelerating the motor above a defined acceleration setpoint.

During programming, the safety controller 402 may be configured to recognize safety drive 202 on the plant network. Accordingly, when the safety controller 402 is networked to safety drive 202, the safety controller 402 may query the drive 202 over the network (e.g., based on the network address or node identifier assigned to the drive 202), and, upon detection of the drive 202, take ownership of the drive's safety subsystem 206, thereby configuring the drive 202 for safe control under the supervision of the safety controller.

In response to determining that the drive 202 has been thus configured by the safety controller 402, safety bypass control component 208 enables the drive's safety subsystem 206 (which had previously been running but was disabled per standard mode operation), transitioning the drive 202 from standard mode operation to safety mode operation. Once safety subsystem 206 is enabled, safety drive 202 operates in a manner similar to safety-rated motor drive 114 described above in connection with FIG. 1B, such that safety subsystem 206 only enables the drive's voltage or pulse outputs to the motor—regardless of instructions from the control subsystem 204—if the safety controller 402 allows motor operation (e.g., based on a confirmation by the controller that all monitored safety conditions are satisfied).

Once the commitment to operate safety drive 202 in safety mode is made (by application of a proper safety configuration, as described above), safety mode is made retentive, and the safety subsystem 206 is enabled each time the drive 202 is powered up and initialized. Once enabled, safety subsystem 206 cannot be re-disabled (i.e., the drive cannot be placed back in standard mode) without returning the drive 202 to its factory default state (typically a multi-step low-level operation that can only be performed via specialized drive interface software by authorized users who have knowledge of the drive's low-level configuration).

When the drive 202 has been configured by safety controller 402 and safety subsystem 206 has been enabled, the drive 202 is configured to only operate under the supervision of the particular safety controller 402 that initially configured the drive, and the safety bypass control component 208 prevents the drive from being re-integrated into a different safety system under the control of a different safety controller. That is, once a given safety controller has taken ownership of the drive's safety subsystem 206, the drive will not allow a different safety controller or safety system to assume supervisory safety control. If a previously configured drive receives a request for control from a different safety controller than that which applied the original safety configuration, the safety subsystem 206 will cause the drive to deny the request.

The configuration-enabled safety drives described above offer a number of benefits over typical safety-rated drives. For example, the drive configuration described herein allows system designers to actuate a motor via the drive without connecting a safety controller to the drive, as long as the drive is operating in its initially configured standard mode prior to application of a safety configuration. As such, the system affords the user the flexibility to perform configuration, testing, tuning, and/or debugging on the drive and its associated motor even if the safety system is not yet in place or available, thereby simplifying system startup. Moreover, since the drive's safety subsystem is disabled internally until a safety configuration is applied, external hardware bypasses (e.g., bypass switches or dedicated bypass terminals that cause the drive to bypass safety features while the terminals are jumpered together) can be omitted from the drive, eliminating the possibility of improper or unsafe bypassing of the drive's safety features by plant personnel.

Additionally, since the configuration-enabled safety motor drive described herein can be operated in either standard mode or safety mode (as well as stand-alone or networked applications), plant engineering/maintenance personnel only need to stock one type of motor drive in inventory for replacement purposes, since the configuration-enabled drive can be configured to suit the requirements of both safety and standard (non-safety) applications.

Figure 5:
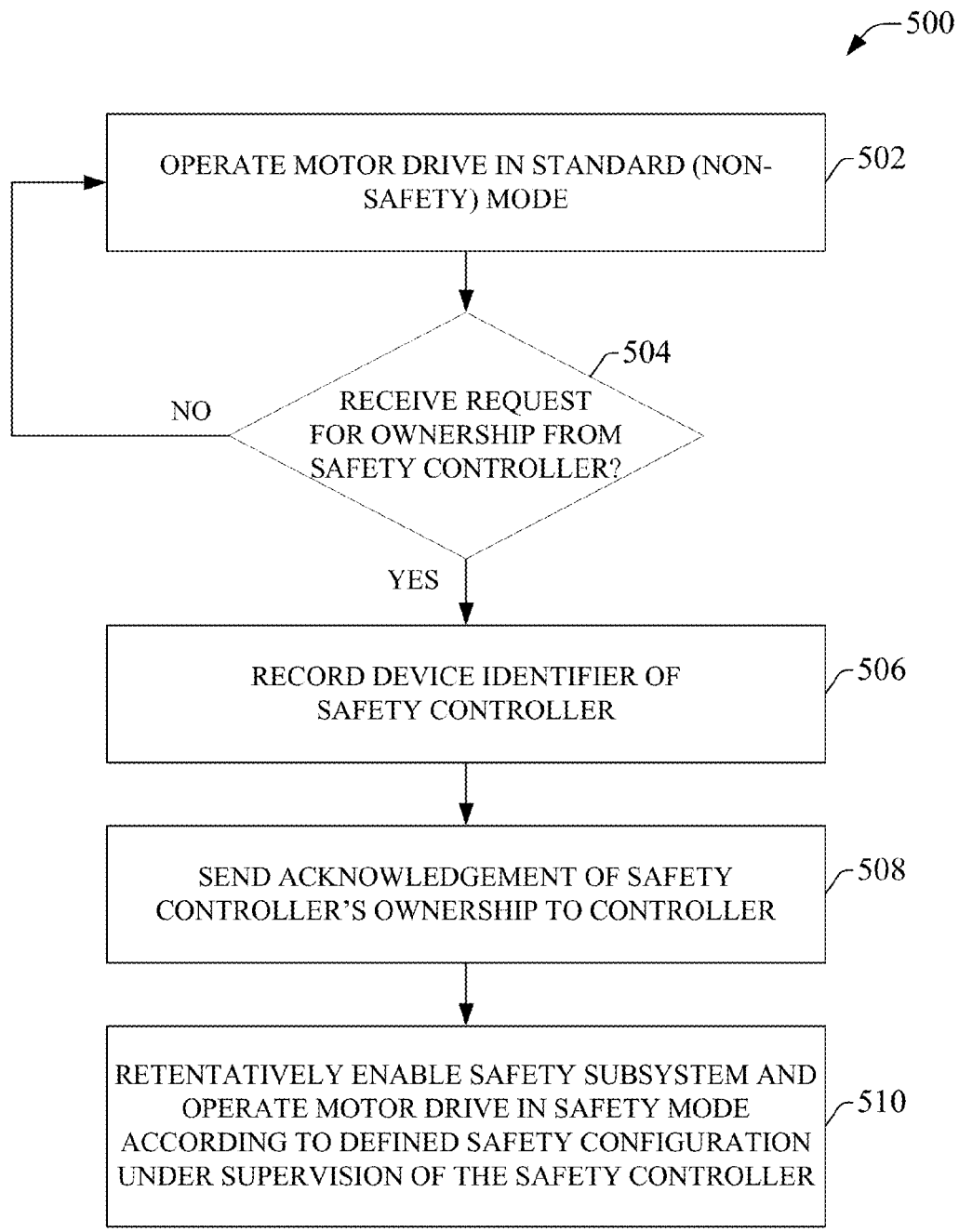
FIG. 5 is a flowchart of an example methodology for enabling a safety subsystem of an industrial motor drive in response to a determination that the drive has been integrated with a safety controller.
Figure 6:
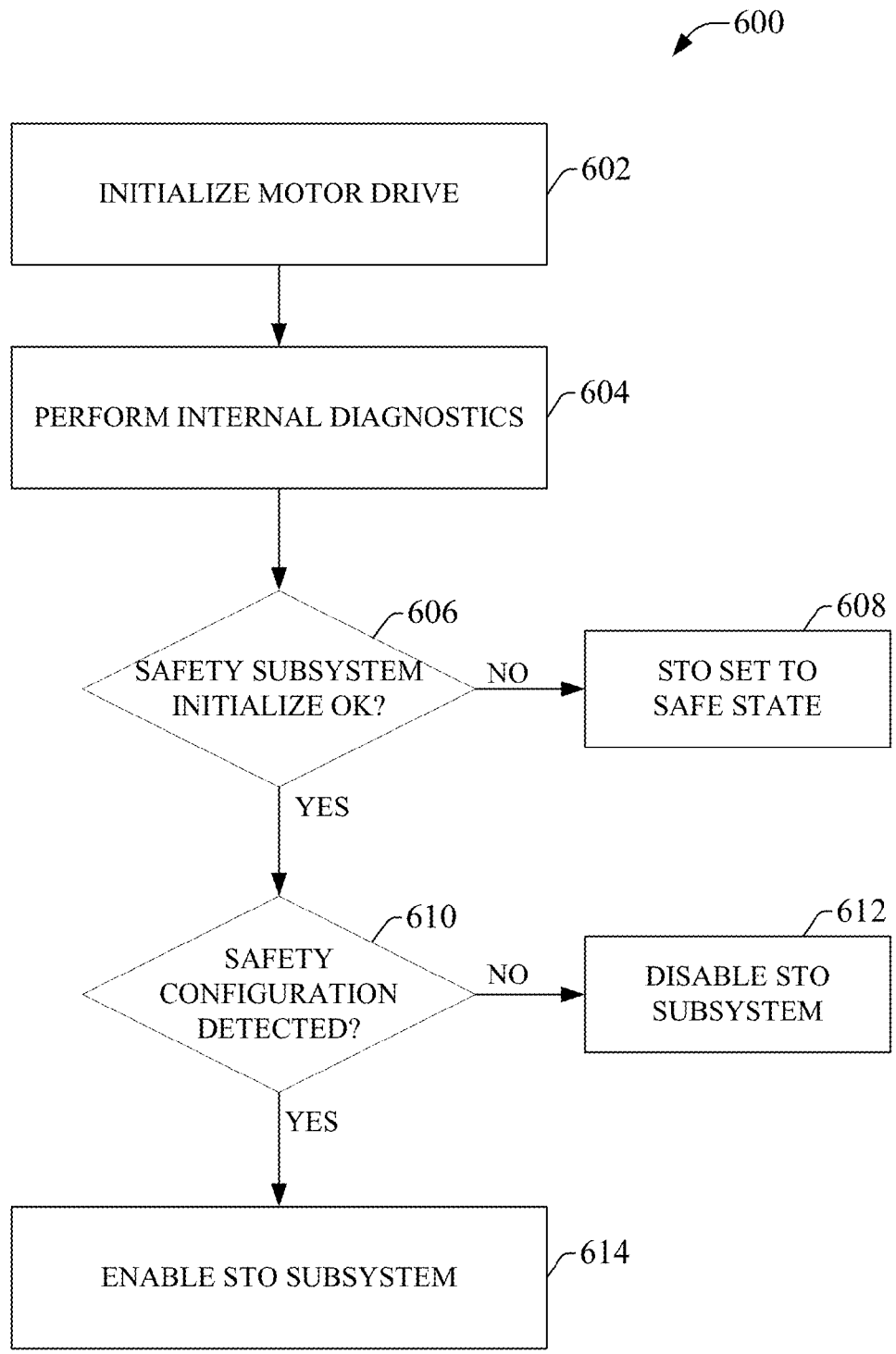
FIG. 6 is a flowchart of an example methodology for initializing a configuration-enabled safety drive.
Figure 7:
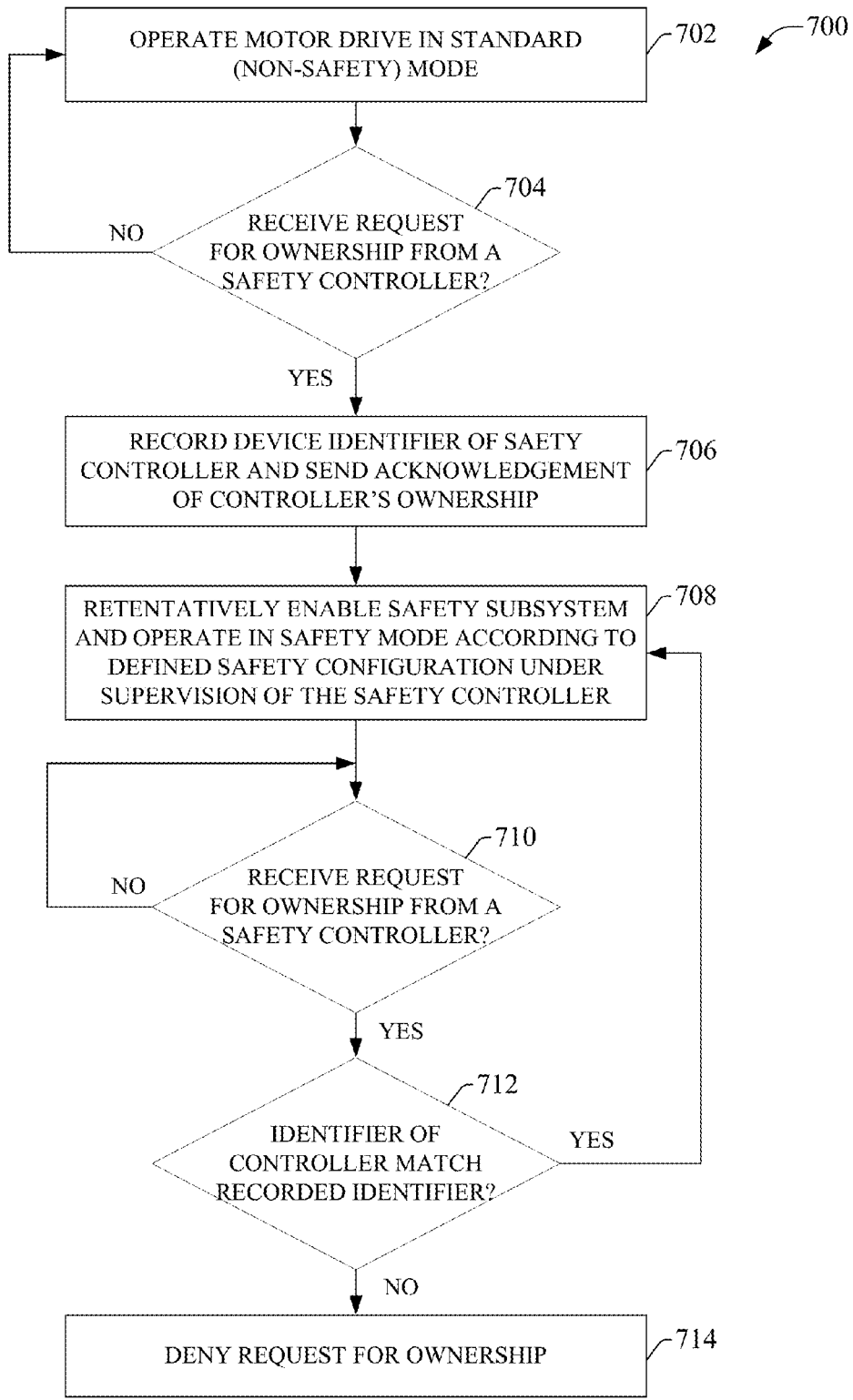
FIG. 7 is a flowchart of an example methodology for enabling and retaining a safety configuration for a motor drive.

FIGS. 5-7 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Although the methodologies of FIGS. 5-7 are described in connection with a safety motor drive, it is to be appreciated that the general method steps can be implemented in other types of industrial safety devices without departing from the scope of this disclosure.

FIG. 5 illustrates an example methodology 500 for enabling a safety subsystem of an industrial motor drive in response to a determination that the drive has been integrated with a safety controller. Initially, at 502, the motor drive is operated in standard (non-safety) mode. In one or more embodiments, the drive is provided to an end user preconfigured for operation in this standard mode as a factory default state. While operating in standard mode, the drive's safety subsystem is running but disabled (bypassed), thereby enabling the output stage of the drive's control subsystem and allowing the drive to send control outputs (e.g., three-phase voltage signals, pulse signals, etc.) to a connected motor without regard for the statuses of external safety input devices or permissives from a safety controller.

At 504, a determination is made regarding whether a request for ownership has been received from a networked safety controller. The safety controller may send the request, for example, in accordance with a safety configuration downloaded from the controller, where the safety configuration specifies the drive as a device to be regulated by the safety controller. The configuration may include a network address or other type of node identifier for the motor drive that allows the controller to recognize the drive. Once configured to recognize the drive, the safety controller may query the drive's address or identifier when the controller is placed on the plant network.

If it is determined at 504 that no request for ownership has been received from the safety controller at the motor drive, the methodology returns to step 502, and the drive continues to operate in standard mode—with the drive's safety subsystem bypassed—until a request for ownership is received. If it is determined at 504 that a request for ownership has been received from the safety controller, the methodology moves to step 506, wherein the drive records the device identifier of the controller (e.g., a unique device identifier provided by the safety controller). The controller's device identifier may be included in the request received at step 504, or may be provided to the drive by the safety controller as part of a handshaking routine performed between the drive and the safety controller.

At 508, the drive sends an acknowledgment of the controller's ownership to the safety controller. This represents an acknowledgment that the drive will henceforth operate under the supervision of the safety controller, in accordance with the safety configuration programmed on the controller. At 510, in response to receipt of the request for ownership from the safety controller, the drive retentively enables its safety subsystem and begins operating with safety integrity under the supervision of the safety controller in accordance with the safety configuration. While operating with safety integrity, the drive's safety subsystem will only enable the output stage of the drive's control subsystem (the outputs to the motor) if permitted by the safety controller. Once enabled, the drive's safety subsystem remains enabled even if power to the drive is cycled.

FIG. 6 illustrates an example methodology 600 for initializing a configuration-enabled safety drive. Initially, at 602, a motor drive is initialized. As described in previous examples, the drive can be a configuration-enabled safety drive capable of operating in a standard (non-safety) mode while in an initial default state, and to transition to a retentive safe mode operation upon receipt of a proper safety configuration (e.g., in response to connection of an industrial safety controller). At 604, the motor drive performs internal diagnostics to confirm proper operation of at least the drive's control and safety subsystems. At 606, a determination is made regarding whether the drive's safety subsystem has properly powered up and initialized. If it is determined that the safety subsystem has not initialized properly—regardless of whether the drive has been configured for safety mode operation—the methodology moves to step 608, wherein the safety enables Safe Torque Off mode and disables the output stage of the control subsystem, preventing torque from being applied to any motors connected to the drive.

Alternatively, if it is determined at step 606 that the safety subsystem has properly initialized, a determination is made at step 610 regarding whether a safety configuration is detected on the drive. This can comprise, for example, determining whether the safety drive was previously configured by a safety controller for safe operation (e.g., using methodology 500 described above in connection with FIG. 5). If no safety configuration is detected, the methodology moves to step 612, wherein the drive's safety STO subsystem is bypassed, allowing the drive to send control outputs (e.g., three-phase voltage or pulse signaling) to an associated motor. Alternatively, if a safety configuration is detected at step 610, the methodology moves to step 614, wherein the drive's safety subsystem is enabled. Enablement of the safety subsystem causes the drive's outputs to the motor to be subservient to the safety controller, such that the drive is prevented from applying torque to the motor if the safety controller detects a safety demand.

FIG. 7 illustrates an example methodology 700 for enabling and retaining a safety configuration for a motor drive. In this example, steps 702-708 may be similar to methodology 500 described above in connection with FIG. 5. Initially, at 702, the motor drive is operated in standard (non-safety) mode. At 704, a determination is made regarding whether a request for ownership has been received from a networked safety controller. If it is determined at 704 that no request for ownership has been received from the safety controller at the motor drive, the methodology returns to step 702, and the drive continues to operate in standard mode—with the drive's safety STO subsystem bypassed—until a request for ownership is received. If it is determined at 704 that a request for ownership has been received from the safety controller, the methodology moves to step 706, wherein the drive records the device identifier of the controller and sends an acknowledgment of the controller's ownership to the safety controller At 708, in response to receipt of the request for ownership from the safety controller, the drive retentively enables its safety STO subsystem and begins operating with safety integrity under the supervision of the safety controller in accordance with the safety configuration.

At 710, a determination is made regarding whether another request for ownership is received from a safety controller. If no request is received, the drive continues to operate with safety integrity under supervision of the safety controller. If another request for ownership is received at 710, the methodology moves to step 712, where a determination is made by the drive regarding whether an identifier of the safety controller from which the request was received at step 712 matches the safety controller identifier recorded at step 706. A mismatched identifier indicates that the drive has been relocated to a different safety system under the control of a different safety controller. However, one or more embodiments of the configuration-enabled safety drives described herein are configured such that, when a safety configuration is applied to the drive, the drive may only be operated within the context of the particular safety system for which the drive was configured. Accordingly, if it is determined at step 712 that the identifier of the safety controller from which the request was received at step 710 does not match the identifier of the safety controller from which the initial request for ownership was received at step 704, the methodology moves to step 714, where the drive denies the request for ownership received at step 712. Alternatively, if the device identifiers are determined to match at step 712, the drive maintains enablement of the safety subsystem and continues to operate with safety integrity under the supervision of the original safety controller.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 8:
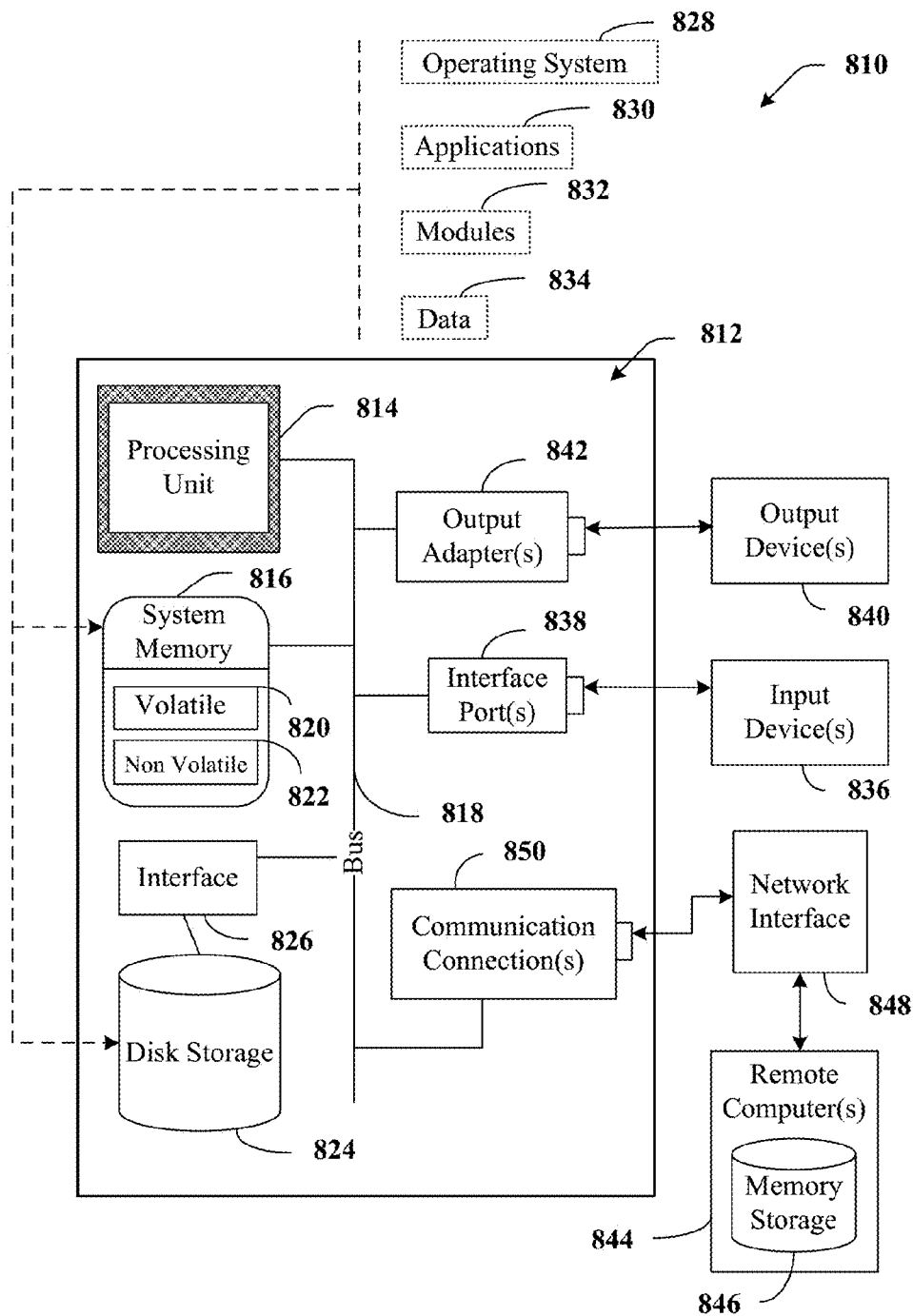
FIG. 8 is an example computing environment.
Figure 9:
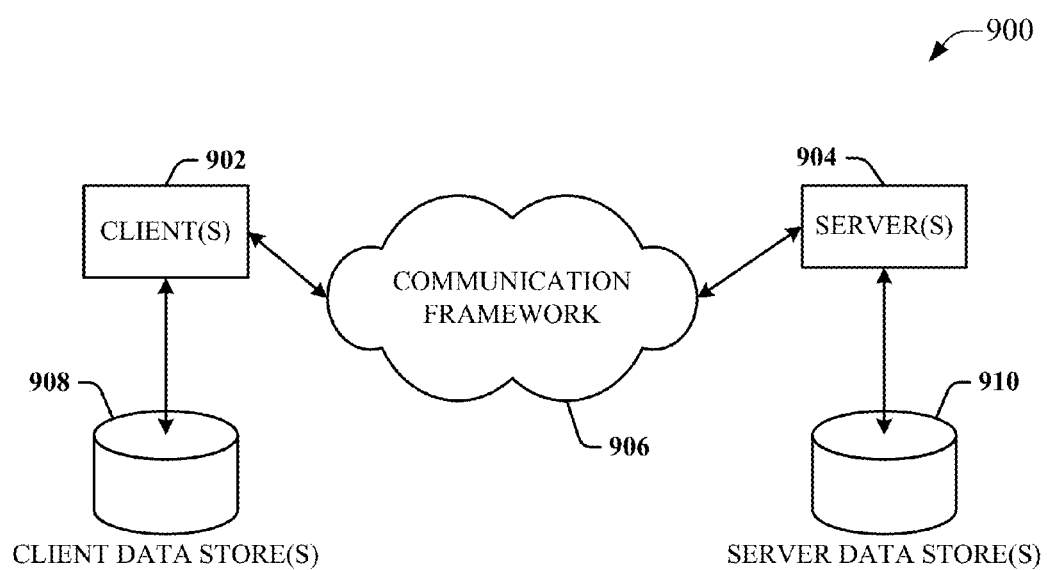
FIG. 9 is an example networking environment.

In order to provide a context for the various aspects of the disclosed subject matter, FIGS. 8 and 9 as well as the following discussion are intended to provide a brief, general description of a suitable environment in which the various aspects of the disclosed subject matter may be implemented.

With reference to FIG. 8, an example environment 810 for implementing various aspects of the aforementioned subject matter includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Multi-core microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable PROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer 812. System applications 830 take advantage of the management of resources by operating system 828 through program modules 832 and program data 834 stored either in system memory 816 or on disk storage 824. It is to be appreciated that one or more embodiments of the subject disclosure can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapters 842 are provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s)

844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the system bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample computing environment 900 with which the disclosed subject matter can interact. The sample computing environment 900 includes one or more client(s) 902. The client(s) 902 can be hardware and/or software (e.g., threads, processes, computing devices). The sample computing environment 900 also includes one or more server(s) 904. The server(s) 904 can also be hardware and/or software (e.g., threads, processes, computing devices). The servers 904 can house threads to perform transformations by employing one or more embodiments as described herein, for example. One possible communication between a client 902 and servers 904 can be in the form of a data packet adapted to be transmitted between two or more computer processes. The sample computing environment 900 includes a communication framework 906 that can be employed to facilitate communications between the client(s) 902 and the server(s) 904. The client(s) 902 are operably connected to one or more client data store(s) 908 that can be employed to store information local to the client(s) 902. Similarly, the server(s) 904 are operably connected to one or more server data store(s) 910 that can be employed to store information local to the servers 904.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A motor drive, comprising:
   a memory that stores executable components;
   a processor, operatively coupled to the memory, that executes the executable components, the executable components comprising:
   a controller interface component configured to exchange data with a safety controller via a network;
   a control component configured to control an output of the motor drive;
   a safety component configured to enable and disable the output of the motor drive in accordance with a safety configuration; and
   a safety bypass control component configured to enable the safety component in response to receipt of request data from the safety controller requesting ownership of the safety component and a determination that the motor drive has been configured with the safety configuration.

2. The motor drive of claim 1, wherein the safety bypass control component is further configured to maintain the safety component in a disabled state prior to the determination that the motor drive has been configured with the safety configuration.

3. The motor drive of claim 1, wherein the safety subsystem is further configured to enable and disable the output of the motor drive in accordance with control data received from the safety controller.

4. The motor drive of claim 1, wherein the safety component is configured to initialize and enter a disabled state prior to the determination that the motor drive has been configured with the safety configuration.

5. The motor drive of claim 4, wherein the safety bypass control component is further configured to disable the output of the motor drive in response to a determination that the safety component has not initialized correctly.

6. The motor drive of claim 1, wherein the safety bypass control component is further configured to record a device identifier of the safety controller in response to the receipt of the request data.

7. The motor drive of claim 6, wherein the safety controller is a first safety controller, and the safety bypass control component is further configured to disable the output of the motor drive in response to receipt of other request from a second safety controller for ownership of the safety component.

8. The motor drive of claim 1, wherein the control component is configured to control the output of the motor drive based on at least one of a local control routine that executes on the memory or commands issued by an industrial controller communicatively connected to the motor drive.

9. The motor drive of claim 1, wherein the output of the motor drive comprises at least one of a three-phase voltage output or a pulse output.

10. The motor drive of claim 1, wherein the safety bypass control component is configured to enable the safety component in a retentive manner.

11. A method, comprising:
initializing, by a motor drive comprising a processor, a control subsystem of the motor drive configured to control an output of the motor drive;
initializing, by the motor drive, a safety subsystem of the motor drive configured to enable and disable the output of the motor drive based on a safety configuration;
determining, by the motor drive, whether the motor drive has been configured with the safety configuration;
in response to determining that the motor drive has not been configured with the safety subsystem, disabling, by the motor drive, the safety subsystem; and
in response to determining that the motor drive has been configured with the safety configuration and has received, via a network, configuration data from a safety controller indicating that the motor drive is to be supervised by the safety controller, enabling, by the motor drive, the safety subsystem.

12. The method of claim 11, further comprising, in response to a determination that the safety subsystem has not initialized properly, disabling the output of the motor drive.

13. The method of claim 11, further comprising controlling, by the safety subsystem, enablement of the output of the motor drive based on safe state confirmation data received from the safety controller.

14. The method of claim 11, further comprising recording a device identifier of the safety controller in response to the receiving the configuration data.

15. The method of claim 14, wherein the safety controller is a first safety controller, the device identifier is a first device identifier, and the configuration data is first configuration data, and the method further comprises:
receiving second configuration data from a second safety controller;
comparing a second device identifier of the second safety controller with the first device identifier; and
rejecting the second configuration data in response to a determination that the second device identifier does not match the first device identifier.

16. The method of claim 11, further comprising controlling, by the control subsystem, the output of the motor drive based on at least one of a local control program executing on the motor drive or commands received from an industrial controller.

17. The method of claim 11, wherein the enabling the safety subsystem comprises retentively enabling the safety subsystem.

18. A non-transitory computer-readable medium having stored thereon instructions that, in response to execution, cause a motor drive to perform operations, the operations comprising:
confirming initialization of a control component of the motor drive, wherein the control component is configured to control an output of the motor drive in accordance with a control routine;
confirming initialization of a safety component of the motor drive, wherein the safety component is configured to enable and disable the output of the motor drive in accordance with a safety configuration received from a safety controller via a network;
in response to determining that no safety configuration has been applied to the motor drive, disabling the safety component; and
in response to determining that the motor drive has been configured with the safety configuration, enabling the safety component and controlling enablement and disablement of the output of the motor drive in accordance with instructions received from the safety controller.

19. The non-transitory computer-readable medium of claim 18, wherein the enabling the safety component comprises retentively enabling the safety component.

20. The non-transitory computer-readable medium of claim 18, further comprising recording a device identifier of the safety controller in response to receipt of the safety configuration.

* * * * *